(12) United States Patent
Satoh et al.

(10) Patent No.: US 6,838,412 B2
(45) Date of Patent: Jan. 4, 2005

(54) α-OLEFIN POLYMERIZATION CATALYST AND PROCESS FOR PRODUCING α-OLEFIN POLYMER (75) Inventors: Makoto Satoh, Ichihara (JP); Yasuki Fujiwara, Sodegaura (JP); Akio Imai, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 202 days.

(21) Appl. No.: 10/282,181

(22) Filed: Oct. 29, 2002

(65) Prior Publication Data
US 2003/0100440 A1 May 29, 2003

Related U.S. Application Data (63) Continuation of application No. 08/664,267, filed on Jun. 11, 1996, now abandoned.

(30) Foreign Application Priority Data

Jun. 15, 1995 (JP) .............................. 7-149030

(51) Int. Cl.$^7$ ................................................ C08F 4/02
(52) U.S. Cl. ...................................................... 502/116
(58) Field of Search .......................................... 502/116

(56) References Cited

U.S. PATENT DOCUMENTS 4,107,414 A   8/1978   Giannini et al.
4,672,050 A   6/1987   Sasaki et al.
4,900,706 A   2/1990   Sasaki et al.
4,983,561 A   1/1991   Sasaki et al.

FOREIGN PATENT DOCUMENTS

| | | |
|---|---|---|
| EP | 0244678 | 11/1987 |
| EP | 0283011 | 9/1988 |
| EP | 0376084 | 7/1990 |
| EP | 0657473 | 6/1995 |
| JP | 1319508 | 12/1989 |
| JP | 343283 | 7/1991 |

*Primary Examiner*—Bernard Lipman
(74) *Attorney, Agent, or Firm*—Steven, Davis, Miller & Mosher, L.L.P.

(57) ABSTRACT

An α-olefin polymerization catalyst comprising (A) a solid catalyst component containing a titanium compound obtained by treating a solid product having a titanium content of 1.5% by weight or less obtained by reducing $Ti(OR^1)_a X_{4-n}$ ($R^1$ represents a hydrocarbon group having 1 to 20 carbon atoms, X represents a halogen atom and a represents a number satisfying $0<a\leq 4$.) with an organomagnesium compound in the presence of an organosilicon compound having an Si—O bond and an ester compound, with an ester compound, and treating the ester-treated solid with a mixture of an ether compound and titanium tetrachloride or a mixture of an ether compound, titanium tetrachloride and an ester compound, (B) an organoaluminum compound and (C) an electron donative compound, and a process for producing an α-olefin polymer with said α-olefin polymerization catalyst.

3 Claims, 1 Drawing Sheet

Fig. 1

α-OLEFIN POLYMERIZATION CATALYST AND PROCESS FOR PRODUCING α-OLEFIN POLYMER

CROSS REFERENCE TO RELATED APPLICATIONS

This application is a continuation of application Ser. No. 08/664,267, filed Jun. 11, 1996, now abandoned the entire disclosure of which is incorporated hereby by reference in its entirety.

BACKGROUND OF THE INVENTION

1. Field of the Invention

The present invention relates to an α-olefin polymerization catalyst and a process for producing an α-olefin polymer. Particularly, the present invention relates to an α-olefin polymerization catalyst giving a highly stereoregular α-olefin polymer containing an extremely little catalyst residue and amorphous polymer and having excellent mechanical properties and processability, and having an extremely high catalytic activity per a solid catalyst and per a titanium atom, and a process for producing a highly stereoregular α-olefin polymer with said catalyst.

2. Prior Art

As a process for producing the polymer of α-olefin such as propylene, butene-1 or the like, it is well known that the so-called Ziegler-Natta catalyst comprising a transition metal compound of the 4th to 6th Groups and an organometallic compound of the 1st, 2nd or 13th Group in the Periodic Table is used.

In the production of α-olefin polymers, an amorphous polymer is formed as by-product in addition to a highly stereoregular α-olefin polymer having a high value in industrial application. This amorphous polymer has little value in industrial application and effects largely a bad influence on mechanical properties, when the α-olefin polymer is molded to a molded article, a film, a fiber and other fabricated goods to be used. The formation of the amorphous polymer causes the loss of a raw material monomer and at the same time, an apparatus for removing an amorphous polymer becomes necessary to cause an extremely large disadvantage from an industrial viewpoint. Therefore, it is necessary that a catalyst for producing an α-olefin polymer forms no amorphous polymer or forms rarely little.

In the α-olefin polymer obtained, a residue of catalyst comprising a transition metal compound and an organometallic compound remains. As this catalyst residue causes problems in the various points such as stability, processability and the like of the α-olefin polymer, an apparatus for removing the catalyst residue and stabilizing the polymer becomes necessary. As this defect can be improved by increasing a catalyst activity represented by the weight of the α-olefin polymer produced per the unit weight of a catalyst, the above-mentioned apparatus for removing the catalyst residue becomes unnecessary and the reduction of the manufacturing cost of α-olefin polymer also becomes possible.

It is known that highly stereoregular and highly active polymerization of α-olefin can be realized to a certain extent by using a Ti—Mg complex type solid catalyst obtained by reducing a tetra-valent titanium compound with an organomagnesium compound in the presence of an organosilicon compound thereby forming the magnesium-titanium eutectic mixture, in combination with an organoaluminum compound of a promotor and an organosilicon compound as a third component in polymerization. (Japanese Patent Publication (Examined) Nos. Hei 3-43283(1991), Hei 1-319508 (1989))

In any case, a non-extraction and non-deashing process is in a possible level, but furthermore, a more improvement is desired. In the concrete, in order to produce an. α-olefin polymer of high quality, the realization of further highly stereoregular polymerization without sacrificing a particle size distribution and the like is desired. Particularly, in a use such as a field for molding wherein it is desired to make a polymer be in high rigidity, a highly stereoregular polymer brings directly out the quality of a high rigidity, and therefore, the appearance of a catalyst having a further highly stereoregular polymerizability and a narrow particle size distribution is acutely desired.

SUMMARY OF THE INVENTION

An object of the present invention is to provide an α-olefin polymerization catalyst having a narrow particle size distribution and a high catalytic activity enough to be unnecessary for removing a catalyst residue and an amorphous polymer and giving an α-olefin polymer of high stereoregularity, and a process for producing an α-olefin polymer of high quality having a high stereoregularity.

According to the present invention, there are provided an α-olefin polymerization catalyst comprising:

(A) a solid catalyst component containing a titanium compound obtained by treating a solid product having a titanium content of 1.5% by weight or less obtained by reducing $Ti(OR^1)_a X_{4-a}$ ($R^1$ represents a hydrocarbon group having 1 to 20 carbon atoms, X represents a halogen atom and a represents a number satisfying $0 < a \leq 4$.) with an organomagnesium compound in the presence of an organosilicon compound having an Si—O bond and an ester compound, with an ester compound, and successively, with a mixture of an ether compound and titanium tetrachloride or a mixture of an ether compound, titanium tetrachloride and an ester compound;

(B) an organoaluminum compound; and (C) an electron donative compound, and a process for producing an α-olefin polymer which comprises polymerizing an α-olefin with said catalyst.

By using the present catalyst, the fore-mentioned object and particularly, the highly stereoregular polymerization of an α-olefin is attained. The present invention is explained in detail below.

Figure 1:
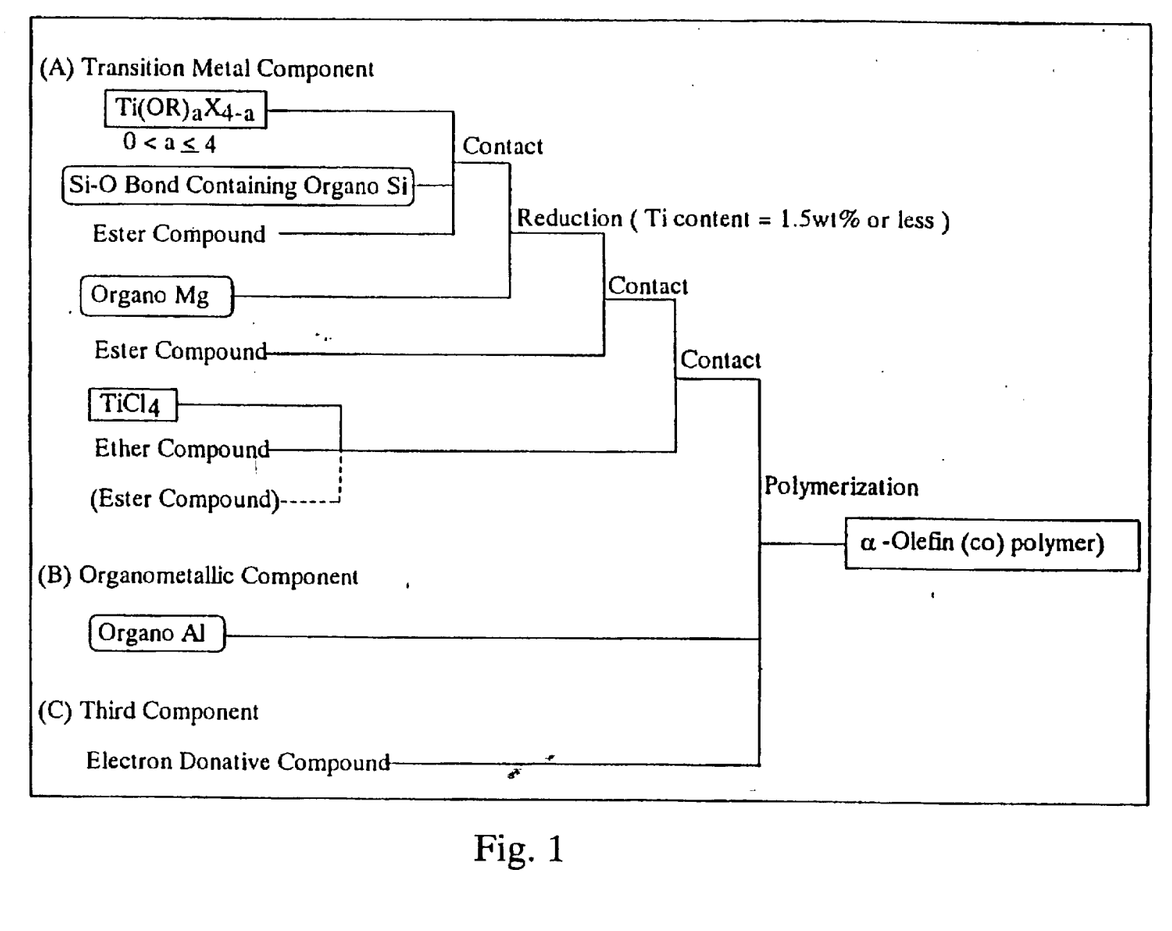
FIG. 1 is a flow-chart for facilitating the understanding of the present invention. The flow-chart is a representative of embodiments of the present invention.

DETAILED DESCRIPTION OF THE INVENTION (a) Titanium Compound

As the titanium compound used for the synthesis of the solid catalyst component (A) in the present invention, titanium compounds represented by the general formula $Ti(OR^1)_1 X_{4-a}$ ($R^1$ represents a hydrocarbon group having 1 to 20 carbon atoms, X represents a halogen atom and a represents a number satisfying $0 < a \leq 4$.) are illustrated. The example of $R^1$ includes an alkyl group such as methyl, ethyl, propyl, isopropyl, butyl, isobutyl, tert-butyl, amyl, iso-amyl, tert-amyl, hexyl, heptyl, octyl, decyl, dodecyl and the like; an aryl group such as phenyl, cresyl, xylyl, naphthyl and the like; an alkenyl group such as propenyl and the like; an aralkyl group such as benzyl and the like; and the like. Among these, an alkyl group having 2 to 18 carbon atoms and an aryl group having 6 to 18 carbon atoms are preferred. Particularly, a straight chain alkyl group having 2 to 18 carbon atoms is preferred. Titanium compounds having 2 or more different $OR^1$ groups each other can be used.

Examples of the halogen atom represented by X can include chlorine, bromine and iodine. Among these, particularly chlorine gives a preferable result.

The value of a in the titanium compound represented by the general formula $Ti(OR^1)_aX_{4-a}$ is a number satisfying $0<a\leq4$, preferably $2\leq a\leq4$ and particularly preferably a=4.

As a synthetic method of the titanium compound represented by the general formula $Ti(OR^1)_aX_{4-a}$, well-known method can be used. For example, a method reacting $Ti(OR^1)_4$ with $TiX_4$ in the predetermined ratio or a method reacting $TiX_4$ with the predetermined amount of a corresponding alcohol ($R^1OH$) can be used. These titanium compounds may be used as solution diluted with a hydrocarbon compound or a halogenated hydrocarbon compound.

The examples include alkoxytitanium trihalide compounds such as methoxytitanium trichloride, ethoxytitanium trichloride, butoxytitanium trichloride, phenoxytitanium trichloride, ethoxytitanium tribromide and the like; dialkoxytitanium dihalide compounds such as dimethoxytitanium dichloride, diethoxytitanium dichloride dibuthoxytitanium dichloride, diphenoxytitanium dichloride, diethoxytitanium dibromide and the like; trialkoxytitanium monohalide compounds such as trimethoxytitanium chloride, triethoxytitanium chloride, tributoxytitanium chloride, triphenoxytitanium chloride, triethoxytitanium bromides and the like; tetraalkoxytitanium compounds such as tetramethoxytitanium, tetraethoxytitanium, tetrabutoxytitanium, tetraphenoxytitanium and the like.

(b) Organosilicon Compound Having Si—O Bond

Examples of the organosilicon compound having an Si—O bond in its molecule used in the synthesis of the solid catalyst component in the present invention, include the ones represented by the following general formulae $Si(OR^2)_1R^3_{4-n}$;

$R^4(R^5_2SiO)_pSiR^6$; and $(R^7_2SiO)_q$ wherein $R^2$ is a hydrocarbon group having 1 to 20 carbon atoms, each $R^3$, $R^4$, $R^5$, $R^6$ and $R^7$ is a hydrocarbon group having 1 to 20 carbon atoms or hydrogen, m is a number satisfying $0<m\leq4$, p is an integer of 1 to 1000 and q is an integer of 2 to 1000.

Examples of the organosilicon compound include tetramethoxysilane, dimethyldimethoxysilane, tetraethoxysilane, triethoxyethylsilane, diethoxydiethylsilane, ethoxytriethylsilane, tetraisopropoxysilane, diisopropoxydiisopropylsilane, tetrapropoxysilane, dipropoxydipropylsilane, tetrabuthoxysilane, dibuthoxydibutylsilane, dicyclopentoxydiethylsilane, diethoxydiphenylsilane, cyclohexyloxytrimethylsilane, phenoxytrimethylsilane, tetraphenoxysilane, triethoxyphenylsilane, hexamethyldisiloxane, hexaethyldisiloxane, hexapropyldisiloxane, octaethyltrisiloxane, dimethylpolysilaxane, diphenylpolysiloxane, methylhydropolysiloxane, phenylhydropolysiloxane and the like.

Among these organosilicon compounds, the alkoxysilane compounds represented by the following general formula $Si(OR^2)_nR^3_{4-n}$ are preferred, $I\leq m\leq4$ is preferred and tetraalkoxysilane compounds of m=4 are particularly preferred.

(c) Ester Compound

As the ester compound used in the present invention, mono- and polyvalent carboxylates are used, and the examples can include saturated aliphatic carboxylates, olefinic carboxylates, alicyclic carboxylates and aromatic carboxylates. Concrete examples include methyl acetate, ethyl acetate, phenyl acetate, methyl propionate, ethyl propionate, ethyl butyrate, ethyl valerate, methyl acrylate, ethyl acrylate, methyl methacrylate, ethyl benzoate, butyl benzoate, methyl toluate, ethyl toluate, ethyl methoxybenzoate, diethyl succinate, dibutyl succinate, diethylmalonate, dibutyl malonate, dimethyl maleate, dibutyl maleate, diethyl itaconate, dibutyl itaconate, monoethyl phthalate, dimethyl phthalate, methylethyl phthalate, diethylphthalate, di-n-propyl phthalate, diisopropyl phthalate, di-n-butyl phthalate, diisobutyl phthalate, di-n-octyl phthalate, diphenyl phthalate and the like.

Among these ester compounds, unsaturated aliphatic carboxylates such as methacrylates, maleates and the like and phthalates are preferred, and diesters of phthalic acid are more preferred.

(d) Organomagnesium Compound

As the organomagnesium compound used in the present invention, any organomagnesium compounds having an Mg-carbon bond in its molecule can be used.

Particularly, a Grignard compound represented by the general formula $R^8MgX$ (wherein $R^8$ represents a hydrocarbon group having up to 20 carbon atoms and X represents a halogen) and dialkyl magnesium compounds and diaryl magnesium compounds represented by the general formula:

$R^9R^{10}$ Mg (wherein each $R^9$ and $R^{10}$ represents a hydrocarbon group having up to 20 carbon atoms) are preferably used. $R^8$, $R^9$ and $R^{10}$ may be the same or different and the examples include one such as alkyl groups, aryl groups, aralkyl groups and alkenyl groups having up to 20 carbon atoms such as methyl, ethyl, propyl, isopropyl, butyl, sec-butyl, amyl, isoamyl, hexyl, octyl, 2-ethylhexyl, phenyl, benzyl and the like.

Examples of the Grignard compound include methylmagnesium chloride, ethylmagnesium chloride, ethylmagnesium bromide, ethylmagnesium iodide, propylmagnesium chloride, propylmagnesium bromide, butylmagnesiumchloride, butylmagnesium bromide, sec-butylmagnesium chloride, sec-butylmagnesium bromide, t-butylmagnesium chloride, t-butylmagnesium bromide, amylmagnesium chloride, isoamylmagnesium chloride hexylmagnesium chloride, phenylmagnesium chloride phenylmagnesium bromide and the like, and the compounds represented by the general formula $R^9R^{10}$ Mg include dimethylmagnesium, diethylmagnesium, dipropylmagnesium, diisopropylmagnesium, dibutylmagnesium, di-sec-butylmagnesium, di-tert-butylmagnesium, butyl-sec-butylmagnesium, diamylmagnesium, dihexylmagnesium, diphenylmagnesium, butylethylmagnesium and the like.

As a solvent for synthesizing the above-mentioned organomagnesium compound, an ether solvent such as diethyl ether, dipropyl ether, diisopropyl ether, dibutyl ether, diisobutyl ether, diamyl ether, diisoamyl ether, dihexyl ether, dioctyl ether, diphenyl ether, dibenzyl ether, phenetole, anisole, tetrahydrofuran or the like can be used. A hydrocarbon solvent such as hexane, heptane, octane, cyclohexane, methylcyclohexane, benzene, toluene, xylene or the like, or a mixed solvent of the ether and the hydrocarbon may be used.

It is preferred to use the organomagnesium compound in the state of an ether solution and as the ether solution, an ether compound having 6 or more carbon atoms in its molecule or a cyclic ether compound is used. A Grignard compound represented by the general formula $R^8MgX$ is preferably used as an ether solution from the point of a catalyst ability. Further, the complex of the above-mentioned organomagnesium compound and an organometallic compound other than Mg soluble in a hydrocarbon can be used. As the example of the organometallic compound, the organic compound of Li, Be, B, Al or Zn is mentioned.

(e) Ether Compound

As the ether compound used in the present invention, dialkyl ethers such as diethyl ether, dipropyl ether, diisopropyl ether, dibutyl ether, diisobutyl ether, diamyl ether, diisoamyl ether, dineopenyl ether, dihexyl ether, dioctyl ether, methylbutyl ether, methylisoamyl ether, ethylisobutyl ether and the like are mentioned. Among these, dibutyl ether and diisoamyl ether are particularly preferred.

(f) Synthesis of Solid Catalyst

The solid catalyst of the present invention is synthesized by treating a solid product obtained by reducing the titanium compound by the organomagnesium compound in the presence of the organosilicon compound and the ester compound, with the ester compound and successively, with the mixture of the ether compound and titanium tetrachloride or the mixture of the ether compound, titanium tetrachloride and the ester compound. All these synthetic reactions are carried out under the atmosphere of an inert gas such as nitrogen, argon or the like.

As the method of the reduction of the titanium compound by the organomagnesium compound, either a method adding the organomagnesium compound to the mixture of the titanium compound, the organosilicon compound and the ester compound, or a method adding inversely the mixture of the titanium compound, the organosilicon compound and the ester compound to the mixture of the organomagnesium compound solution is adopted. Between the two, the method adding the organomagnesium compound to the mixture of the titanium compound, the organosilicon compound and the ester compound is preferred from the viewpoint of the catalyst activity.

The titanium compound, the organosilicon compound and the ester compound are preferably used in the solution in or dilution with a suitable solvent. Such a solvent includes aliphatic hydrocarbons such as hexane, heptane, octane, decane and the like; aromatic hydrocarbon atoms such as toluene, xylene and the like; alicyclic hydrocarbon atoms such as cyclohexane, methylcyclohexane, decalin and the like; ether compounds such as diethyl ether, dibutyl ether, diisoamyl ether, tetrahydrofuran and the like.

The reduction temperature is preferably $-50$ to $70°$ C., more preferably $-30$ to $50°$ C. and particularly preferably $-25$ to $35°$ C. When the reduction temperature is too high, the catalyst activity becomes low.

In the synthesis of the solid product according to the reduction, it is possible to let a porous material such as an inorganic oxide, an organic polymer or the like coexist and to impregnate the solid product in the porous material. The porous material preferably has a micropore volume of 0.3 ml/g or more in a micropore radius of 20 to 200 nm and an average particle diameter of 5 to 300 $\mu$m.

The porous inorganic oxide includes $SiO_2$, $Al_2O_3$, MgO, $TiO_2$, $ZrO_2$, $SiO_2$—$A_2O_3$ complex oxide, MgO— $Al_2O_3$ complex oxide, MgO—$SiO_2$—$Al_2O_3$ complex oxide and the like. The porous polymer includes polystyrenes, polyacrylates, polymethacrylates, polyacrylonitriles, polyvinyl chlorides, polyolefins and the like. Concrete examples of the porous polymer include polystyrene, styrene-divinylbenzene copolymer, styrene-N,N'-alkylene dimethacrylamide copolymer, styrene-ethyleneglycol methyldimethacrylate copolymer, polymethylacrylate, polyethylacrylate, methylacrylate-divinylbenzene copolymer, ethylacrylate-divinylbenzene copolymer, polymethylmethacrylate, methylmethacrylate-divinylbenzene copolymer, polyethyleneglycol dimethylmethacrylate, polyacrylonitrile, acrylonitrile-divinylbenzene copolymer, polyvinyl chloride, polyvinyl pyroridine, polyvinyl pyridine, ethylvinylbenzene-divinylbenzene copolymer, polyethylene, ethylene-methyl acrylate copolymer, polypropylene and the like. Among these porous material, $SiO_2$, $Al_2O_3$ and styrene-divinylbenzene copolymer are preferred.

The dropwise addition time is not specifically restricted and usually about 30 minutes to 12 hours. After completion of the reduction, the post reaction may be carried out at a temperature of 20 to $120°$ C.

The amount of the organosilicon compound used is preferably 1 to 50, more preferably 3 to 30 and particularly preferably 5 to 25 in terms of an atomic ratio of the silicon atom to the titanium atom in the titanium compound (Si/Ti). The amount of the ester compound used is preferably 0.05 to 10, more preferably 0.1 to 6 and particularly preferably 0.2 to 3 in terms of molar ratio of the ester compound to the titanium atom of the titanium compound (ester compound/Ti). Furthermore, the amount of the organomagnesium compound used is preferably 0.1 to 10, more preferably 0.2 to 5.0 and particularly preferably 0.2 to 2.0 in terms of the atomic ratio of the sum of the silicon atom and the titanium atom to the magnesium atom (Ti+Si/Mg).

The solid product obtained by the reduction is subjected to solid-liquid separation and washed several times with an inert hydrocarbon solvent such as hexane, heptane or the like. The solid product thus obtained contains a tri-valent titanium, magnesium and a hydrocarbyloxy group and indicates usually a non crystallinity or an extremely low crystallinity. From the point of the catalyst ability, an amorphous structure is particularly preferred.

The first characteristic of the present invention is that the titanium content of the solid product obtained by the reduction is 1.5% by weight or less, more preferably 0.01 to 1.4% by weight and most preferably 0.1 to 1.3% by weight. When the titanium content exceeds 1.5% by weight, the amount of the cold xylene soluble part which is an amorphous polymer having a little value for an industrial application, increases. Besides, at the same time, a polymerization activity decreases and a productivity deteriorates.

Next, the solid product obtained by the above-mentioned method is treated with the ester compound. The amount of the ester compound used is preferably 0.1 to 150 mol, more preferably 0.3 to 60 mol and particularly preferably 0.5 to 30 mol per 1 mol of the titanium atom contained in the solid product. The amount of the ester compound used per 1 mol of the magnesium atom contained in the solid product is preferably 0.01 to 1.0 mol and more preferably 0.03 to 0.5 mol. When the amount of the ester compound is excessively much, the particles intends to degradation.

The treatment of the solid product with the ester compound can be carried out by any of well-known methods capable of contacting the solid product with the ester compound such as a slurry method or a mechanical pulverization means by a ball-mill or the like. However, when the mechanical pulverization is applied, finely ground particles from the solid catalyst component are formed in a large amount, and the particle size distribution becomes broad, and it is not preferable from the industrial point of view. Accordingly, it is preferred to contact both in the presence of a diluent.

As the diluent, aliphatic hydrocarbons such as pentane, hexane, heptane, octane or the like, aromatic hydrocarbons such as benzene, toluene, xylene or the like, alicyclic hydrocarbons such as cyclohexane, cyclopentane or the like, halogenated hydrocarbons such as 1,2-dichloroethane, monochlorobenzene or the like can be used.
Among these, aromatic hydrocarbons and halogenated hydrocarbons are particularly preferred.

The amount of the diluent used is preferably 0.1 ml to 1000 ml and more preferably 1 ml to 100 ml per 1 g of the solid product. The treatment temperature is preferably −50 to 150° C. and more preferably 0 to 120° C. The treatment time is preferably 5 minutes or more and more preferably 15 minutes to 3 hours. After completion of the treatment, the treated solid is allowed to stand to separate the solid from the liquid and successively, washed several times with an inert solvent to obtain an ester-treated solid.

Subsequently, the ester-treated solid is treated with the mixture of the ether compound and titanium tetrachloride. This treatment is preferably carried out in the state of the slurry. The solvent used for slurring includes aliphatic hydrocarbons such as pentane, hexane, heptane, octane, decane and the like, aromatic hydrocarbons such as toluene, xylene and the like, alicyclic hydrocarbon such as cyclohexane, methylcyclohexane, decalin, halogenated hydrocarbons such as dichloroethane, trichloroethylene, monochlorobenzene, dichlorobenzene, trichlorobenzene and the like. Among these, the halogenated hydrocarbon and the aromatic hydrocarbon are preferred.

The slurry concentration is preferably 0.05 to 0.7 g solid/ml-solvent and more preferably 0.1 to 0.5 g solid/ml-solvent. The reaction temperature is preferably 30 to 150° C., more preferably 45 to 135° C. and particularly preferably 60 to 120° C. The reaction time is particularly not restricted. However, a period of about 30 minutes to 6 hours is usually preferred.

As the method feeding the ester-treated solid, the ether compound and titanium tetrachloride, either of a method adding the ether compound and titanium tetrachloride to the ester-treated solid, or a method inversely adding the ester-treated solid to the solution of the ether compound and titanium tetrachloride may be effected. In the method adding the ether compound and titanium tetrachloride to the ester-treated solid, a method adding titanium tetrachloride after adding the ether compound, or a method adding the ether compound and titanium tetrachloride at the same time is preferred, and particularly, a method adding the mixture of the ether compound and titanium tetrachloride previously prepared to the ester-treated solid is preferred.

The reaction of the ester-treated solid with the ether compound and titanium tetrachloride may be repeated twice or more. From the view point of catalyst activity and stereoregularity, it is preferable to repeat at least two times the reaction with the mixture of the ether compound and titanium tetrachloride.

The amount of the ether compound used is preferably 0.1 to 100 mol, more preferably 0.5 to 50 mol and particularly preferably 1 to 20 mol per 1 mol of the titanium atom contained in the solid product. The amount of titanium tetrachloride used is preferably 1 to 1000 mol, more preferably 3 to 500 mol and particularly preferably 10 to 300 mol per 1 mol of a titanium atom contained in the solid product. The amount of titanium tetrachloride used is preferably 1 to 100 mol, more preferably 1.5 to 75 mol and particularly preferably 2 to 50 mol per 1 mol of the ether compound.

In the treatment of the ester-treated solid with the mixture of the ether compound and titanium tetrachloride, an ester compound may coexist. The amount of the ester compound used is preferably 30 mol or less, more preferably 15 mol or less and particularly preferably 5 mol or less per 1 mol of the titanium atom contained in the solid product.

The ester is a member selected from the esters described above.

The solid catalyst containing a titanium compound obtained by the above method is subjected to solid-liquid separation and successively, washed several times with an inert solvent such as hexane, heptane or the like to be used for polymerization. From the view point of catalytic activity and stereoregularity, it is preferable that after solid-liquid separation, the solid catalyst was washed once or more at a temperature of 50 to 120° C. with a large amount of a halogenated hydrocarbon solvent such as monochlorobenzene or the like or an aromatic hydrocarbon solvent such as toluene or the like, then further washed several times with an aliphatic hydrocarbon solvent such as hexane, heptane or the like, and thereafter used in polymerization.

(g) Organoaluminum Compound (B)

The organoaluminum compound (B) used in the present invention has at least one Al-carbon bond in its molecule. The representatives thereof are organoaluminum compounds represented by the general formulae:

wherein $R^{11}$ to $R^{15}$ represent a hydrocarbon group having 1 to 20 carbon atoms, Y represents a halogen, hydrogen or an alkoxy group having 1 to 20 carbon atoms and γ is a number satisfying $2 \leq γ \leq 3$.

Examples of the organoaluminum compound include trialkylaluminums such as triethylaluminum, triisobutylaluminum, trihexylaluminum and the like; dialkylaluminum hydrides such as diethylaluminum hydride, diisobutylaluminum hydride and the like; dialkylaluminum halides such as diethylaluminum chloride and the like; the mixtures of a trialkylaluminums and a dialkylaluminum halide such as a mixture of triethylaluminum and diethylaluminum chloride; alkylalumoxanes such as tetraethyldialumoxane, tetrabutyldialumoxane and the like.

Among these organoaluminum compounds, trialkylaluminums, mixtures of a trialkylaluminum and a dialkylaluminum halide and alkylaluminoxanes are preferred, and particularly, triethylaluminum, triisobutylaluminum, the mixture of triethylaluminum and diethylaluminum chloride, and tetraethyldialumoxane are preferred.

The amount of the organoaluminum compound used can be selected in a wide range as 0.5 to 1000 mol per 1 mol of the titanium atom contained in the solid catalyst, and the range of 1 to 600 mol is particularly preferred.

(h) Electron Donative Compound

As the electron donative compound (C) used for polymerization in the present invention, electron donors containing oxygen such as alcohols, phenols, ketones, aldehydes, carboxylic acids, esters of organic acids and inorganic acids, ethers, acid amides, acid anhydrides and the like; electron donors containing nitrogen such as ammonias, amines, nitrites, isocyanates and the like; and the like can be illustrated. Among them, esters of inorganic acids and ethers are preferred.

The esters of inorganic acids are preferably organosilicon compounds represented by the general formula $R^{16}{}_n Si(OR^{17})_{4-n}$ in which $R^{14}$ is a hydrocarbon group having 1 to 20 carbon atoms or hydrogen, $R^{17}$ is a hydrocarbon group having 1 to 20 carbon atoms, $R^{16}$ and $R^{17}$ each may be different in the same molecule, and n is a number satisfying $0 \leq n < 4$. The example includes tetramethoxysilane, tetraethoxysilane, tetrabutoxysilane, tetraphenoxysilane, methyltrimethoxysilane, ethyltrimethoxysilane, butyltrimethoxysilane, isobutyltrimethoxysilane, tert-butyltrimethoxysilane, isopropyltrimethoxysilane, cyclohexyltrimethoxysilane, phenyltrimethoxysilane, vinyltrimethoxysilane, dimethyldimethoxysilane, diethyldimethoxysilane, dipropyldimethoxysilane, propylmethyldimethoxysilane, diisopropyldimethoxysilane dibutyldimethoxysilane, diisobutyldimethoxysilane, di-tert-butyldimethoxysilane, butylmethyldimethoxysilane, butylethyldimethoxysilane, tert-butylmethyldimethoxysilane, tert-butylethyldimethoxysilane, tert-butyl-n-propyldimethoxysilane, isobutylisopropyldimethoxysilane, tert-butylisopropyldimethoxysilane, tert-butyl-n-butyldimethoxysilane, tert-butylisobutyldimethoxysilane, tert-butyl-sec-butyldimethoxysilane, hexylmethyldimethoxysilane, hexylethyldimethoxysilane, dodecylmethyldimethoxysilane, dicyclopentyldimethoxysilane, cylcopentylmethyldimethoxysilane, cylcopentylethyldimethoxysilane, cylcopentylisopropyldimethoxysilane, cylcopentylisobutyldimethoxysilane, cylcopentyl-tert-butyldimethoxysilane, dicyclohexyldimethoxysilane, cyclohexylmethyldimethoxysilane, cyclohexylethyldimethoxysilane, cyclohexylisopropyldimethoxysilane, cyclohexylisobutyldimethoxysilane, cyclohexyl-tert-butyldimethoxysilane, cyclohexylcyclopentyldimethoxysilane, cyclohexylphenyldimethoxysilane, diphenyldimethoxysilane, phenylmethyldimethoxysilane, phenylisopropyldimethoxysilane, phenylisobutyldimethoxysilane, phenyl-tert-butyldimethoxysilane, phenylcylcopentyldimethoxysilane, vinylmethyldimethoxysilane, methyltriethoxysilane, ethyltriethoxysilane, butyltriethoxysilane, isobutyltriethoxysilane, tert-butyltriethoxysilane, isopropyltriethoxysilane, cyclohexyltriethoxysilane, phenyltriethoxysilane, vinyltriethoxysilane, dimethyldiethoxysilane, diethyldiethoxysilane, dipropyldiethoxysilane, propylmethyldiethoxysilane, diisopropyldiethoxysilane, dibutyldiethoxysilane, diisobutyldiethoxysilane, di-tert-butyldiethoxysilane, butylmethyldiethoxysilane, butylethyldiethoxysilane, t-butylmethyldiethoxysilane, hexylmethyldiethoxysilane, hexylethyldiethoxysilane, dodecylmethyldiethoxysilane, dicyclopentyldiethoxysilane, dicyclohexyldiethoxysilane, cyclohexylmethyldiethoxysilane, cyclohexylethyldietboxysilane, diphenyldiethoxysilane, phenylmethyldiethoxysilane, vinylmethyldiethoxysilane, ethyltriisopropoxysilane, vinyltributoxysilane, phenyltri-tert-butoxysilane, 2-norbornanetrimethoxysilane, 2-norbornanetriethoxysilane, 2-norbornanemethyldimethoxysilane, trimethylphenoxysilane, methyltriaryloxysilane and the like.

The ethers are preferably dialkyl ethers and diether compounds represented by the general formula:

wherein $R^1$, to $R^{21}$ are independently a straight chain or branched alkyl, alicyclic, aryl, alkylaryl or arylalkyl group having up to 20 carbon atoms and $R^{18}$ or $R^{19}$ may be hydrogen. The examples include diethyl ether, dipropyl ether, diisopropyl ether, dibutyl ether, diamyl ether, diisoamyl ether, dineopenyl ether, dihexyl ether, dioctyl ether, methylbutyl ether, methylisoamyl ether, ethylisobutyl ether, 2,2-diisobutyl-1,3-dimethoxypropane, 2-isopropyl-2-isopentyl-1,3-dimethoxypropane, 2,2-bis(cyclohexylmethyl)-1,3-dimethoxypropane, 2-isopropyl-2-3,7-dimethyloctyl-1,3-dimethoxypropane, 2,2-diisopropyl-1,3-dimethoxypropane, 2-isopropyl-2-cyclohexylmethyl-1,3-dimethoxypropane, 2,2-dicyclohexyl-1,3-dimethoxypropane, 2-isopropyl-2-isobutyl-1,3-dimethoxypropane, 2,2-diisopropyl-1,3-dimethoxypropane, 2,2-dipropyl-1,3-dimethoxypropane, 2-isopropyl-2-cyclohexyl-1,3-dimethoxypropane, 2-isopropyl-2-cylcopentyl-1,3-dimethoxypropane, 2,2-dicyclopentyl-1,3-dimethoxypropane, 2-heptyl-2-pentyl-1,3-dimethoxypropane and the like.

Among these electron donative compounds, organosilicon compounds represented by the general formula $R^{22}R^{23}Si(OR^{24})_2$ are particularly preferred. (Wherein $R^{22}$ is a hydrocarbon group having 3 to 20 carbon atoms in which the carbon adjacent to Si is secondary or tertiary, and the example includes branched alkyl groups such as isopropyl group, sec-butyl group, t-butyl group, tert-amyl group and the like, cycloalkyl groups such as cyclopentyl group, cyclohexyl group and the like, cycloalkenyl groups such as cyclopentenyl group and the like, aryl groups such as phenyl group, tolyl group and the like. $R^{23}$ is a hydrocarbon group having 1 to 20 carbon atoms and the example includes straight chain alkyl groups such as methyl group, ethyl group, propyl group, butyl group, pentyl group and the like, branched alkyl groups such as isopropyl group, sec-butyl group, tert-butyl group, tert-amyl group and the like, cycloalkyl groups such as cyclopentyl group, cyclohexyl group and the like, cycloalkenyl groups such as cyclopentenyl group and the like, aryl groups such as phenyl group, tolyl group and the like. $R^{24}$ is a hydrocarbon group having 1 to 20 carbon atoms and preferably a hydrocarbon group having 1 to 5 carbon atoms.

Examples of the organosilicon compound used as such electron donative compound include diisopropyldimethoxysilane, diisobutyldimethoxysilane, di-tert-butyldimethoxysilane, tert-butylmethyldimethoxysilane, tert-butylethyldimethoxysilane, tert-butyl-n-propyldimethoxysilane, isobutylisopropyldimethoxysilane, tert-butylisopropyldimethoxysilane, tert-butyl-n-butyldimethoxysilane, tert-butylisobutyldimethoxysilane, tert-butyl-sec-butyldimethoxysilane dicyclopentyldimethoxysilane, cylcopentylisopropyldimethoxysilane, cylcopentylisobutyldimethoxysilane, cylcopentyl-tert-butyldimethoxysilane, dicyclohexyldimethoxysilane, cyclohexylmethyldimethoxysilane, cyclohexylethyldimethoxysilane, cyclohexylisopropyldimethoxysilane, cyclohexylisobutyldimethoxysilane, cyclohexyl-tert-butyldimethoxysilane, cyclohexylcyclopentyldimethoxysilane, cyclohexylphenyldimethoxysilane, diphenyldimethoxysilane, phenylmethyldimethoxysilane, phenylisopropyldimethoxysilane, phenylisobutyldimethoxysilane, phenyl-tert-butyldimethoxysilane, phenylcylcopentyldimethoxysilane, diisopropyldiethoxysilane, diisobutyldiethoxysilane, di-tert-butyldiethoxysilane, tert-butylmethyldiethoxysilane, dicyclopentyldiethoxysilane, dicyclohexyldiethoxysilane, cyclohexylmethyldiethoxysilane, cyclohexylethyldiethoxysilane, diphenyldiethoxysilane, phenylmethyldiethoxysilane, 2-norbornanemethyldimethoxysilane and the like.

(i) Process for polymerizing olefin

The α-olefin applied to the present invention is an α-olefin having 3 or more carbon atoms and the examples include straight chain mono-olefins such as propylene, butene-1, pentene-1, hexene-1, heptene-1, octene-1, decene-1 and the like; branched mono-olefins such as 3-methylbutene-1,3-methylpentene-1,4-methylpentene-1 and the like; vinylcyclohexane and the like. These α-olefins may be used alone or in combination of two or more. In other words, the present invention includes homopolymerization of an α-olefin, copolymerization of an α-olefin with another α-olefin and the like. Among these α-olefins, it is preferred to homopolymerize propylene or butene-1 or copolymerize a mixed olefin comprising propylene as the main component and it is particularly preferred to homopolymerize propylene or copolymerize the mixed olefin comprising propylene as the main component. In the copolymerization of the present invention, the mixture of ethylene and at least one α-olefin selected from the above α-olefins can be used. Furthermore, it is possible to use a compound having 2 or more unsaturated bonds such as a conjugated diene or a non-conjugated diene in the copolymerization. A hetero-block copolymerization which comprises two or more polymerization steps can be easily carried out.

The feeding of each catalyst component to a polymerization vessel is not particularly restricted except feeding in the water-free state under an inert gas such as nitrogen, argon or the like.

The solid catalyst component (A), the organoaluminum compound (B) and the electron donative compound (C) may be fed separately or either two of them are previously, contacted and then fed.

In the present invention, it is possible to polymerize olefins in the presence of the above-mentioned catalyst but a preliminary polymerization described below may be performed before carrying out the above polymerization (hereinafter, referred to as "polymerization" or "main polymerization").

The preliminary polymerization is carried out in the presence of the solid catalyst component (A) and the organoaluminum compound (B) by feeding a small amount of an olefin and is preferred to carried out in the slurry state. As a solvent used for slurring, an inert hydrocarbon such as propane, butane, isobutane, pentane, isopentane, hexane, heptane, octane, cyclohexane, benzene or toluene can be used. In the formation of slurry, a part or the all part of the inert hydrocarbon may be replaced with a liquid olefin.

The amount of the organoaluminum compound used in the preliminary polymerization can be selected from wide range as from 0.5 to 700 mol per 1 mol of the titanium atom in the solid catalyst component, and the amount is preferably 0.8 to 500 mol, more preferably 1 to 200 mol per 1 mol of the titanium atom in the solid catalyst component. The amount of the olefin to be preliminarily polymerized is usually 0.01 to 1000 g, preferably 0.05 to 500 g and particularly preferably 0.1 to 200 g per 1 g of the solid catalyst component.

The slurry concentration in the preliminary polymerization is preferably 1 to 500 g-the solid catalyst component/liter-solvent and particularly preferably 3 to 300 g-the solid catalyst component/liter-solvent. The temperature of the preliminary polymerization is preferably −20 to 100° C., more preferably 0 to 80° C. The partial pressure of the olefin in the gas phase in the preliminary polymerization is preferably 0.01 to 20 kg/cm$^2$ and particularly 0.1 to 10 kg/cm$^2$ is preferred, but this does not applied to the olefin being liquid at the pressure and temperature of the preliminary polymerization. Furthermore, the preliminary polymerization time is not particularly restricted and 2 minutes to 15 hours is usually preferred.

In carrying out the preliminary polymerization, the feeding of the solid catalyst component (A), the organoaluminum compound (B) and the olefin may be adopted either by a method for feeding the olefin after contacting the solid catalyst component (A) with the organoaluminum compound (B), or a method for feeding the organoaluminum compound (B) after contacting the solid catalyst component (A) with the olefin. The feeding of the olefin may be adopted either by a method for feeding the olefin successively or continuously while keeping a fixed pressure in the polymerization vessel, or by a method for feeding all of a predetermined amount of olefin at the start. A chain transfer agent such as hydrogen can be added in order to control the molecular weight of a polymer to be obtained.

Furthermore, in the preliminary polymerization of a small amount of the olefin in the presence of solid catalyst component (A) and the organoaluminum compound (B), the electron donative compound (C) may, if necessary, coexist. The electron donative compound used is a part or the all part of the above electron donative compound (C). The amount used is preferably 0.01 to 400 mol, more preferably 0.02 to 200 mol and particularly preferably 0.03 to 100 mol per 1 mol of the titanium atom contained in the solid catalyst component (A), and preferably 0.003 to 5 mol, more preferably 0.005 to 3 mol and particularly preferably 0.01 to 2 mol per the organoaluminum compound (B).

The feeding method of the electron donative compound (C) in the preliminary polymerization is not particularly restricted. It may be fed separately from the organoaluminum compound (B) and after contacting with the organoaluminum compound (B), it may be fed. The olefin used in the preliminary polymerization may be the same or different from the olefin used in the main polymerization.

After the preliminary polymerization was carried out as mentioned above, or without performing the preliminary polymerization, the main polymerization of α-olefins can be carried out in the presence of the α-olefin polymerization catalyst comprising the above-mentioned solid catalyst component (A), the organoaluminum compound (B), and the electron donative compound (C).

The amount of the organoaluminum compound used in the main polymerization can be selected from such a wide range as from 1 to 1000 mol per 1 mol of the titanium atom contained in the solid catalyst component (A), and the range of 5 to 600 mol per 1 mol of the titanium atom contained in the solid catalyst component (A) is particularly preferred.

The amount of the electron donative compound (C) used in the present polymerization is preferably 0.1 to 2000 mol, more preferably 0.3 to 1000 mol and particularly preferably 0.5 to 800 mol per 1 mol of a titanium atom contained in the solid catalyst component (A), and preferably 0.001 to 5 mol, more preferably 0.005 to 3 mol and particularly preferably 0.01 to 1 mol per the organoaluminum compound (B).

The main polymerization can be carried out at a temperature of −30 to 300° C. and preferably 20 to 180° C. There is particularly no restriction on the polymerization pressure. However, from industrial and economical viewpoints, the pressure is preferably a normal pressure to 100 kg/cm$^2$ and more preferably about 2 to 50 kg/cm$^2$. As the polymerization form, either of a batchwise polymerization and a continuous polymerization are possible. A slurry polymerization or a solution polymerization in an inert hydrocarbon such as propane, butane, isobutane, pentane, hexane, heptane or octane, a bulk polymerization in which liquid olefins at the polymerization temperature is used a medium, or a gas phase polymerization may be adopted.

In the main polymerization, it is possible to add a chain transfer agent such as hydrogen or the like in order to control the molecular weight of the polymer to be produced.

EXAMPLE

The present invention is explained in detail by Examples and Comparative Examples as follows but the present invention is not particularly limited thereto. The evaluating methods of various material properties of the polymer in Examples are as follows:

(1) Xylene-soluble part at 20° C. (hereinafter, abbreviated as "CXS")

After dissolving 1 g of the polymerization powder in 200 ml of boiling xylene, the obtained solution was slowly cooled to 50° C. and successively cooled to 20° C. with stirring. After allowed to stand for 3 hours at 20° C., the polymer precipitated is separated by filtration. Xylene is evaporated from the filtrate under vacuum at 60° C. thereby drying and a polymer soluble in xylene at 20° C. is recovered. and weighed to determine % by weight to the total polymer. When the value of CXS is the smaller, an amorphous polymer is the less and it indicates a high stereoregularity.

(2) Intrinsic viscosity (hereinafter, abbreviated as [η]) It was measured in tetralin solvent at 135° C.

Example 1

(a) Synthesis of Solid Product

After a 500 ml flask equipped with a stirrer and a dropping funnel was substituted with nitrogen, 290 ml of hexane, 2.4 ml of tetrabuthoxytitanium(2.4 g, 7.1 mmol), 2.5 ml (2.6 g, 9.3 mmol) of diisobutyl phthalate, and 76.4 ml of tetraethoxysilane(71.4 g, 342 mmol) were thrown into the flask to obtain a homogeneous solution. Next, while keeping a temperature in the flask at 5° C., 181 ml of the n-butyl ether solution of n-butylmagnesium chloride (manufactured by YUKI GOSEI YAKUHIN Company Ltd. and the concentration of n-butylmagnesium chloride is 2.1 mmol/ml) was gradually dropped into the flask taking 3.3 hour from the dropping funnel.

After completion of dropping, it was further stirred for 30 minutes at 5° C. and successively, further stirred for 1 hours at room temperature. Thereafter, after the resulting mixture was subjected to solid-liquid separation, thus obtained solid was washed repeatedly three times with 180 ml of toluene and then 155 ml of toluene was added thereto.

A portion of the solid product slurry was sampled and the composition analysis was carried out. The titanium atom of 0.87% by weight, no phthalate, the ethoxy group of 33.1% by weight and the butoxy group of 1.6% by weight were contained in the solid product. The slurry concentration was 0.196 g/ml.

(b) Synthesis of Ester-Treated Solid

After a 50 ml flask equipped with a stirrer and a dropping funnel was substituted with nitrogen, 30 ml of the slurry containing the solid product obtained in the above (a) was thrown into the flask, and furthermore, 4.2 ml of toluene was added. The temperature was elevated to 105° C. and stirred for 30 minutes. Next, 5.0 ml(18.7 mmol: 0.85 ml of diisobutyl phthalate/1 g of the solid product) of diisobutyl phthalate was added and reacted at 105° C. for 30 minutes. After the reaction, the resulting reaction mixture was subjected to solid-liquid separation. Thus obtained solid was washed twice with 30 ml of toluene.

(c) Synthesis of Solid Catalyst Component (Activating Treatment)

After washing in the above (b), 7.4 ml of toluene, 0.33 ml of diisobutyl phthalate, 0.59 ml(3.49 mmol) of di-n-butyl ether and 9.4 ml (0.086 mol) of titanium tetrachloride were added to the flask and reacted for 3 hours at 105° C. After the completion of the reaction, the resulting mixture was subjected to solid-liquid separation at the same temperature. The obtained solid was washed twice with 30 ml of toluene at the same temperature. Next, 7.4 ml of toluene, 0.59 ml(3.49 mmol) of di-n-butyl ether and 4.7 ml(0.043 mol) of titanium tetrachloride were added to the washed solid and reacted for 1 hour at 105° C. After completion of the reaction, the obtained mixture was subjected to solid-liquid separation at the same temperature and successively, after washing the separated solid three times with 30 ml of toluene at the same temperature, the washed solid was washed further three times with 30 ml of hexane and dried under vacuum to obtain 4.1 g of the solid catalyst component.

In the solid catalyst component, a titanium atom of 1.64% by weight, the phthalate of 9.45% by weight, ethoxy group of 0.5% by weight and butoxy group of 0.2% by weight were contained. In observation of the solid catalyst component using a microscope, it had an excellent particle property containing no fine particle.

(d) Polymerization of Propylene

A 3-liter stirring type stainless autoclave was substituted with argon, and 2.6 mmol of triethylaluminum, 0.26 mmol of cyclohexylethyldimethoxysilane and 7.2 mg of the solid catalyst component synthesized in (c) were fed in the autoclave and hydrogen corresponding to a partial pressure of 0.33 kg/cm$^2$ was added.

Subsequently, 780 g of liquid propylene was fed in to the autoclave, the temperature of the autoclave was elevated to 80° C. and the polymerization was carried out for 1 hour at 80° C. After the polymerization, an unreacted monomer was purged. The polymer produced was dried under vacuum for 2 hours at 60° C. to obtain 333 g of the polypropylene powder.

Therefore, the yield of the polypropylene per 1 g of the solid catalyst component (hereinafter, abbreviated as PP/Cat) was 46,300(g/g). The ratio of the xylene-soluble part at 20° C. (CXS) contained in the total yield was 0.66(wt %), the intrinsic viscosity of the polymer [η] was 1.88 dl/g. The polymerization conditions and the polymerization results are shown in Table 1.

Comparative Example 1

(a) Synthesis of Solid Product

It was reacted in the same manner as in (a) of Example 1 except that the amounts of the reagents used were 7.5 ml(7.5 g, 22 mmol) of tetrabutoxytitanium, 2.5 ml(2.6 g, 9.3 mmol) of diisobutyl phthalate, 74.5 ml(70.3 g, 338 mmol) of tetraethoxysilane and 173 ml of the organomagnesium compound solution. After the solid product obtained by solid-liquid separation was repeatedly washed three times by 300 ml of hexane and three times by 300 ml of toluene, 270 ml of toluene was added. When a portion of the solid product slurry was sampled and a composition analysis was performed, the titanium atom of 1.80% by weight, the phthalate of 0.1% by weight, the ethoxy group of 35.0% by weight and the butoxy group of 3.2% by weight were contained in the solid product.

(b) Synthesis of Ester-Treated Solid

After a 200 ml flask equipped with a stirrer, a dropping funnel and a thermometer was substituted with nitrogen, 84 ml of the slurry containing the solid product obtained in the above (a) was thrown into the flask, furthermore, 12.1 ml of the supernatant was taken out, 7.8 ml(29 mmol) of diisobutyl phthalate was added and they ere reacted at 95° C. for 30 minutes. After the reaction, the resulting mixture was subjected to solid-liquid separation and the obtained solid was washed twice by 59 ml of toluene.

(c) Synthesis of Solid Catalyst Component (Activating Treatment)

After the washing in the above (b), 15.3 ml of toluene, 0.66 ml(2.5 mmol) of diisobutyl phthalate, 1.2 ml(7.1 mmol) of di-n-butyl ether and 23.4 ml(0.213 mol) of titanium tetrachloride were added to the flask and reacted for 3 hours at 105° C. After completion of the reaction, the resulting mixture was subjected to solid-liquid separation at the same temperature and successively, the obtained solid was washed twice by 59 ml of toluene at the same temperature. Next, 12.0 ml of toluene, 1.2 ml(7.1 mmol) of di-n-butyl ether and 11.7 ml(0.106 mol) of titanium tetrachloride were added and reacted for 1 hour at 105° C. After completion of the reaction, the obtained mixture was subjected to solid-liquid separation at the same temperature and successively, after washed three times with 59 ml of toluene at the same temperature, the solid was washed three times with 59 ml of hexane and dried further under vacuum to obtain 8.1 g of the solid catalyst component.

In the solid catalyst component, the titanium atom of 1.5% by weight, the phthalate of 8.9% by weight, the ethoxy group of 0.4% by weight and the butoxy group of 0.1% by weight were contained.

(d) Polymerization of Propylene

The polymerization of propylene was carried out in the same manner as in Example 1 (d) except using 4.0 mg of the solid catalyst component obtained in the above (c). As the result, The catalyst activity (PP/Cat) was low as 30,000 (g/g), the stereoregularity was low at CXS=0.74(wt %) and the [η] was 2.01 dl/g. The polymerization conditions and the polymerization results are shown in Table 1.

Example 2

(a) Synthesis of Solid Product

The synthesis of the solid product was performed in the same manner as in (a) of Example 1 except that the amounts of the reagents used were 4.8 ml(4.8 g, 14 mmol) of tetrabutoxytitanium, 2.5 ml(2.6 g, 9.3 mmol) of diisobutyl phthalate and 75.0 ml(70.1 g, 336 mmol) of tetraethoxysilane.

The portion of the solid product slurry was sampled and subjected to composition analysis. As results, the titanium atom of 1.22% by weight, the ethoxy group of 33.4% by weight and the butoxy group of 2.32% by weight were contained in the solid product and no phthalate was detected. The slurry concentration was 0.208 g/ml.

(b) Synthesis of Ester-Treated Solid

The synthesis of the ester-treated solid was performed in the same manner as in (b) of Example 1 except that the amount of the slurry containing the solid product obtained in the above (a) was 25 ml and the amount of diisobutyl phthalate was 3.5 ml.

(c) Synthesis of Solid Catalyst Component (Activating Treatment)

After the washing in the above (b), 6.5 ml of toluene, 0.29 ml(1.08 mmol) of diisobutyl phthalate, 0.52 ml(3.07 mmol) of di-n-butyl ether and 10.4 ml(0.095 mol) of titanium tetrachloride were added to the flask and reacted for 3 hours at 105° C. After completion of the reaction, the resulting mixture was subjected to solid-liquid separation at the same temperature and successively, washed twice with 25 ml of toluene at the same temperature. Next, 6.5 ml of toluene, 0.52 ml(3.07 mmol) of di-n-butyl ether and 5.2 ml(0.048 mol) of titanium tetrachloride were added and reacted for 1 hour at 105° C. After the completion of the reaction, it was subjected to solid-liquid separation at the same temperature and successively, after washed three times with 25 ml of toluene at the same temperature, the solid was washed three times with 25 ml of hexane and dried further under vacuum to obtain 3.4 g of the solid catalyst component.

In the solid catalyst component, the titanium atom of 1.42% by weight, the phthalate of 7.92% by weight, the ethoxy group of 0.64% by weight and the butoxy group of 0.10% by weight were contained. In the observation by a microscope, the solid catalyst component had an excellent particle property containing no fine particle.

(d) Polymerization of Propylene

The polymerization of propylene was performed in the same manner as in the polymerization of propylene of Example 1 (d) except using the solid catalyst component obtained in the above (c). As results, the PP/Cat was 43,900 (g/g), the CXS was 0.68(wt %) and the [η] was 1.82 dl/g. The polymerization conditions and the polymerization results are shown in Table 1.

Example 3

(a) Synthesis of Solid Product

The synthesis of the solid product was performed in the same manner as in (a) of Example 1 except that the amounts of the reagents used were 267 ml of hexane, 3.0 ml(3.0 g, 8.8 mmol) of tetrabutoxytitanium, 2.5 ml(2.6 g, 9.3 mmol) of diisobutyl phthalate, 71.6 ml(66.9 g, 321 mmol) of tetraethoxysilane and 170 ml of di-n-butyl ether solution of n-butylmagnesium chloride. When a portion of the solid product slurry was sampled and subjected to a composition analysis, the titanium atom of 0.74% by weight, the phthalate of 0.099% by weight, the ethoxy group of 33.9% by weight and the butoxy group of 1.67% by weight were contained in the solid product.

(b) Synthesis of Ester-Treated Solid

The synthesis of the solid treated with the ester was performed in the same condition as in (b) of Example 1.

(c) Synthesis of Solid Catalyst Component (Activating Treatment)

The synthesis of the solid catalyst component was performed in the same manner as in (c) of Example 2. In the solid catalyst component, the titanium atom of 1.40% by weight, the phthalate of 9.13% by weight, the ethoxy group of 0.59% by weight and the butoxy group of 0.15% by weight were contained. In the observation by a microscope, the solid catalyst component had an excellent particle property containing no fine particle.

(d) Polymerization of Propylene

The polymerization of propylene was performed in the same manner as in the polymerization of propylene of Example (d) except using the solid catalyst component obtained in the above (c). As results, the PP/cat was 43,800 (g/g), the CXS was 0.58 (wt %) and the [η] was 1.70 dl/g.

The polymerization conditions and the polymerization results are shown in Table 1.

Example 4
(a) Synthesis of Solid Product

The synthesis of the solid product was performed in the same manner as in (a) of Example 1 except that the amount of the reagent used was 3.2 ml(3.2 g, 9.4 mmol) of tetrabutoxytitanium, 7.5 ml(7.8 g, 28 mmol) of diisobutyl phthalate, 76.0 ml(71.0 g, 341 mmol) of tetraethoxysilane and 186 ml of di-n-butyl ether solution of n-butylmagnesium chloride. When a portion of the solid product slurry was sampled and subjected to a composition analysis, the titanium atom of 0.39% by weight, the ethoxy group of 27.1% by weight and the butoxy group of 1.66% by weight were contained in the solid product and no phthalate was detected. The slurry concentration was 0.180 g/ml.

(b) Synthesis of Ester-Treated Solid

After a 200 ml flask equipped with a stirrer, a dropping funnel and a thermometer was substituted with nitrogen, 28 ml of the slurry containing the solid product obtained in the above (a) was thrown into the flask, and furthermore, 1 ml of toluene was added thereto. The temperature was elevated to 105° C. and stirred for 30 minutes. Next, 3.35 ml(3.48 g, 12.5 mmol) of diisobutyl phthalate was added and they were reacted at 105° C. for 30 minutes. After the reaction, the resulting mixture was subjected to solid-liquid separation and the obtained solid washed twice by 25 ml of toluene.

(c) Synthesis of Solid Catalyst Component (Activating Treatment)

After the end of the washing in the above (b), 7 ml of toluene, 0.28 ml(0.29 g, 1.05 mmol) of diisobutyl phthalate, 0.5 ml(0.39 g, 3.0 mmol) of di-n-butyl ether and 10 ml(17.3 g, 0.091 mol) of titanium tetrachloride were added to the flask and reacted for 3 hours at 105° C. After completion of the reaction, the resulting mixture was subjected to solid-liquid separation at the same temperature and successively, washed twice with 25 ml of toluene at the same temperature. Next, 7 ml of toluene, 0.5 ml(0.39 g, 3.0 mmol) of di-n-butyl ether and 5.0 ml(8.7 g, 0.046 mol) of titanium tetrachloride were added and reacted for 1 hour at 105° C. After completion of the reaction, it was subjected to solid-liquid separation at the same temperature and successively, after washed three times with 25 ml of toluene at the same temperature, washed three times with 25 ml of hexane and dried further under vacuum to obtain 3.1 g of the solid catalyst component. In the solid catalyst component, the titanium atom of 1.63% by weight, the phthalate of 7.75% by weight, the ethoxy group of 0.66% by weight and the butoxy group of 0.14% by weight were contained. When the solid catalyst component was observed by a microscope, it had an excellent particle property containing no fine particle.

(d) The Polymerization of Propylene

The polymerization of propylene was performed in the same manner as in the polymerization of propylene of Example 1 (d) except using the solid catalyst component obtained in the above-mentioned (c).

As results, the PP/Cat was 38,200 (g/g), the CXS was 0.77 (wt %) and the [η] was 1.79 dl/g. The polymerization conditions and the polymerization results are shown in Table 1.

Example 5
(d) Polymerization of Propylene

The polymerization of propylene was performed in the same manner as in the polymerization of propylene of Example 1 (d) except using tert-butyl-n-propyldimethoxysilane in place of cyclohexylethyldimethoxysilane. As results, the PP/Cat was 57,200 (g/g), the CXS was 0.61 (wt %) and the [η] was 2.36 dl/g. The polymerization conditions and the polymerization results were shown in Table 1.

Comparative Example 2
(a) Synthesis of Solid Product

After the synthesis of the solid product was performed in the same manner as in (a) of Comparative Example 1 except that the amounts of the reagents used were 7.5 ml(7.5 g, 22 mmol) of tetrabutoxytitanium, 2.5 ml(2.6 g, 9.3 mmol) of diisobutyl phthalate, 73.8 ml(68.9 g, 331 mmol) of tetraethoxysilane and 168 ml of the organomagnesium compound solution, it was heated for 1 hour at 105° C.

When a portion of the solid-product slurry was sampled and subjected to a composition analysis, the titanium atom of 1.9% by weight, the phthalate of 0.2% by weight, the ethoxy group of 35.6% by weight and the butoxy group of 2.71 by weight were contained in the solid product.

(b) Synthesis of Ester-Treated Solid

After a 10 ml flask was substituted with nitrogen, 6.5 g of the solid product synthesized in (a), 16.2 ml of toluene and 5.5 ml(21 mmol) of diisobutyl phthalate were added and reacted at 95° C. for 1 hour. After the reaction, the resulting mixture was subjected to solid-liquid separation and the obtained solid was washed three times with 33 ml of toluene.

(c) Synthesis of Solid Catalyst Component (Activating Treatment)

The synthesis of the solid catalyst component was performed in the same manner as in (c) of Comparative Example 1. In the solid catalyst component, the titanium atom of 1.9% by weight, the phthalate of 12.3% by weight, the ethoxy group of 0.4% by weight and the butoxy group of 0.2% by weight were contained.

(d) Polymerization of Propylene

The polymerization of propylene was performed in the same manner as in the polymerization of propylene of Example 5 (d) except using the solid catalyst component obtained in the above (c).

As results, the PP/Cat was 45,000 (g/g), the CXS was 0.61 (wt %) and the [η] was 2.42 dl/g. The polymerization conditions and the polymerization results are shown in Table 1.

TABLE 1

| | Titanium content of the solid product (wt %) | Electron donative compound | Polymerization result | | |
|---|---|---|---|---|---|
| | | | PP/Cat (g/g) | CXS (wt %) | [η] (dl/g) |
| Example 1 | 0.87 | CHEDMS | 46300 | 0.66 | 1.88 |
| Comparative Example 1 | 1.80 | CHEDMS | 30000 | 0.74 | 2.01 |
| Example 2 | 1.22 | CHEDMS | 43900 | 0.68 | 1.82 |
| Example 3 | 0.74 | CHEDMS | 43800 | 0.58 | 1.70 |
| Example 4 | 0.39 | CHEDMS | 38200 | 0.77 | 1.79 |
| Example 5 | 0.87 | tBnPDMS | 57200 | 0.61 | 2.36 |
| Comparative Example 2 | 1.90 | tBnPDMS | 45000 | 0.61 | 2.42 |

CHEDMS: cyclohexylethyldimethoxysilane
tBnPDMS: tert-butyl-n-propyldimethoxysilane According to the present invention, there are provided an α-olefin polymerization having so high a stereoregularity and catalytic activity that the removal of the catalyst residue and amorphous polymer is unnecessary, and a process for producing an α-olefin polymer having a high stereoregularity of high quality.

What is claimed is:

1. An α-olefin polymerization catalyst consisting essentially of:

(A) a solid catalyst component containing a titanium compound obtained by treating a solid product having a titanium content of 0.01 to 1.3% by weight obtained by reducing titanium tetrabutoxy titanium with n-butyl magnesium chloride in the presence of tetraethoxy silane and diisobutylphthalate, with diisobutylphthalate, and treating the ester-treated solid with a mixture of di-n-butyl ether and titanium tetrachloride or a mixture of di-n-butyl ether, titanium tetrachloride and diisobutylphthalate, wherein the amount of di-n-butyl ether is 0.1 to 100 mol per 1 mol of the titanium atom contained in the solid product, the amount of the titanium tetrachloride is 1 to 1000 mol per 1 mol of the titanium atom contained in the solid product and the amount of diisobutylphthalate is 30 mol or less per 1 mol of the titanium atom contained in the solid product;

(B) triethyl aluminum (C) an organosilicon compound represented by the general formula $R^{16}{}_n Si(OR^{17})_{4-n}$ in which $R^{16}$ is a hydrocarbon group having 1 to 20 carbon atoms, $R^{17}$ is a hydrocarbon group having 1 to 20 carbon atoms, $R^{16}$ and $R^{17}$ each may be different in the same molecule and n is a number satisfying $0 \leq n < 4$.

2. An α-olefin polymerization catalyst according to claim 1, wherein the amount of diisobutylphthalate used in the treatment of the solid product os 0.1 to 150 mol per 1 mol of the titanium atom contained in the solid product, and 0.01 to 1.0 mol per 1 mol of the magnesium atom contained in the solid product.

3. An α-olefin polymerization catalyst according to claim 1, wherein the titanium content of the catalyst is 0.1 to 1.3% by weight.

* * * * *